US010009440B2

(12) United States Patent
Deb et al.

(10) Patent No.: US 10,009,440 B2
(45) Date of Patent: Jun. 26, 2018

(54) CROWDSOURCING ENTITY INFORMATION (71) Applicant: Microsoft Technology Licensing, LLC, Redmond, WA (US)

(72) Inventors: Viman Deb, San Jose, CA (US);
Huining Feng, Cupertino, CA (US);
Aviad Pinkovezky, Los Altos, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 405 days.

(21) Appl. No.: 14/725,615

(22) Filed: May 29, 2015

(65) Prior Publication Data
US 2016/0352860 A1    Dec. 1, 2016

(51) Int. Cl.
*G06F 15/16* (2006.01)
*H04L 29/08* (2006.01)
*G06Q 50/00* (2012.01)

(52) U.S. Cl.
CPC ........... *H04L 67/306* (2013.01); *G06Q 50/01* (2013.01)

(58) Field of Classification Search
CPC ............................. H04L 67/306; G06Q 50/01
USPC ....................................................... 709/204
See application file for complete search history.

(56) References Cited

U.S. PATENT DOCUMENTS

| 2012/0005113 | A1* | 1/2012 | Kotis | G06Q 10/10 705/321 |
| 2014/0279722 | A1* | 9/2014 | Singh | G06F 17/30702 706/11 |
| 2015/0135043 | A1* | 5/2015 | Apps | G06Q 10/10 715/202 |
| 2016/0005000 | A1* | 1/2016 | Ross | G06Q 10/1053 705/321 |

* cited by examiner

*Primary Examiner* — Sm Rahman
(74) *Attorney, Agent, or Firm* — Schwegman Lundberg & Woessner, P.A.

(57) ABSTRACT

Generally discussed herein are methods, systems, and apparatuses for crowdsourcing data. A method can include identifying a first entity has an auto-created profile on a social network site or has a profile page that has been abandoned by an administrator of the profile page, identifying a user of the site includes the first entity in their profile or includes a second entity in their profile where the second entity includes an industry identifier that matches an industry identifier of the first entity, prompting the user determined to be associated with the first entity to verify data about the first entity in the auto-created profile or provide new data about the first entity, and updating the auto-created profile of the first entity in response to the user confirming that the prior data is incorrect or providing new data about the first entity.

14 Claims, 4 Drawing Sheets

CROWDSOURCING ENTITY INFORMATION

TECHNICAL FIELD

Examples generally relate to systems, apparatuses, and methods for crowdsourcing data. More specifically, one or more embodiments relate to crowdsourcing data about an entity that includes a profile page on a social network.

BACKGROUND

The term "crowdsourcing" is a blend of the terms "crowd" and "outsourcing". In crowdsourcing, rather than work or data being provided from a defined group of persons, the work or data is provided by a generally undefined, solicited group of persons. Crowdsourcing has many applications and can include dividing labor, crowdfunding where people seek to fund their project through financial contributions from a generally undefined group of donors, and crowdtesting where software developers rely on a generally undefined group of software testers to find bugs and/or help improve the user experience of their software.

BRIEF DESCRIPTION OF THE DRAWINGS

In the drawings, which are not necessarily drawn to scale, like numerals can describe similar components in different views. Like numerals having different letter suffixes can represent different instances of similar components. The drawings illustrate generally, by way of example, but not by way of limitation, various embodiments discussed herein.

DETAILED DESCRIPTION

Discussed generally herein are systems, devices, and methods for crowdsourcing data for an entity's profile page on a social network site. The entity can be a non-person entity that has a profile page on the site, such as a company, a non-profit organization, a government organization, a group, such as a professional group, or other entity. On the popular social networking site LinkedIn, accessible at www.linkedin.com and hosted by LinkedIn Corporation of Mountain View, Calif., there are many companies without profile pages. An entity that does not have a profile page may have a profile page auto-created or created by a user. Also, a profile page may have an administrator that has abandoned the profile page (e.g., not provided an update to or accessed the profile page for a specified period of time, such as one or more days, months, years, etc.). The profile page of the entity may not include some information about the entity (e.g., the entity's address, a logo for the entity, an industry in which the entity operates, and/or other information about the entity). Additionally or alternatively, the profile page of the entity may include information that is incorrect.

Crowdsourcing information from an undefined population of users (i.e. anyone who responds) provides a lot of data, but can include inaccurate information. By reducing the population of users to a subset of users that is affiliated with the entity about which information is being crowdsourced, the accuracy of the information gained can be more accurate. This is in part because the persons affiliated with the entity can have a reason to provide accurate information by virtue of their affiliation with the entity.

In one or more embodiments, a device, system, or method (e.g., a partially to fully automated method) identifies an entity that has an incomplete profile on a social networking site. A potential candidate for crowdsourcing information can be identified. A candidate for crowdsourcing can include a member of a social network site who is or was associated with the entity or the industry in which the entity operates. The candidate can be solicited for data regarding the entity. Such devices, systems, and methods can help make the information on a profile page more complete and/or robust.

Since the data provided in an auto-created entity profile page is generally more susceptible to error than data in a user-created profile page, the devices, systems, and methods are discussed herein in the context of auto-created profile pages. However, these devices, systems, and methods have many applications beyond auto-created profile pages.

The subject matter discussed herein is also applicable to profile pages that have been abandoned by an administrator. Such profile pages may not have been updated to include the most recent company information, thus making the information on the current profile page inaccurate.

Reference will now be made to the figures to describe details of one or more embodiments. Generally, an embodiment is discussed with reference to a social network system that can include an entity profile page, however, the system is not limited to this context. The system(s), apparatus(es), and method(s) can be implemented in one or more modules that can be implemented on a computing device as a standalone, add-on, or plug-in for another application, among other implementations.

Figure 1:
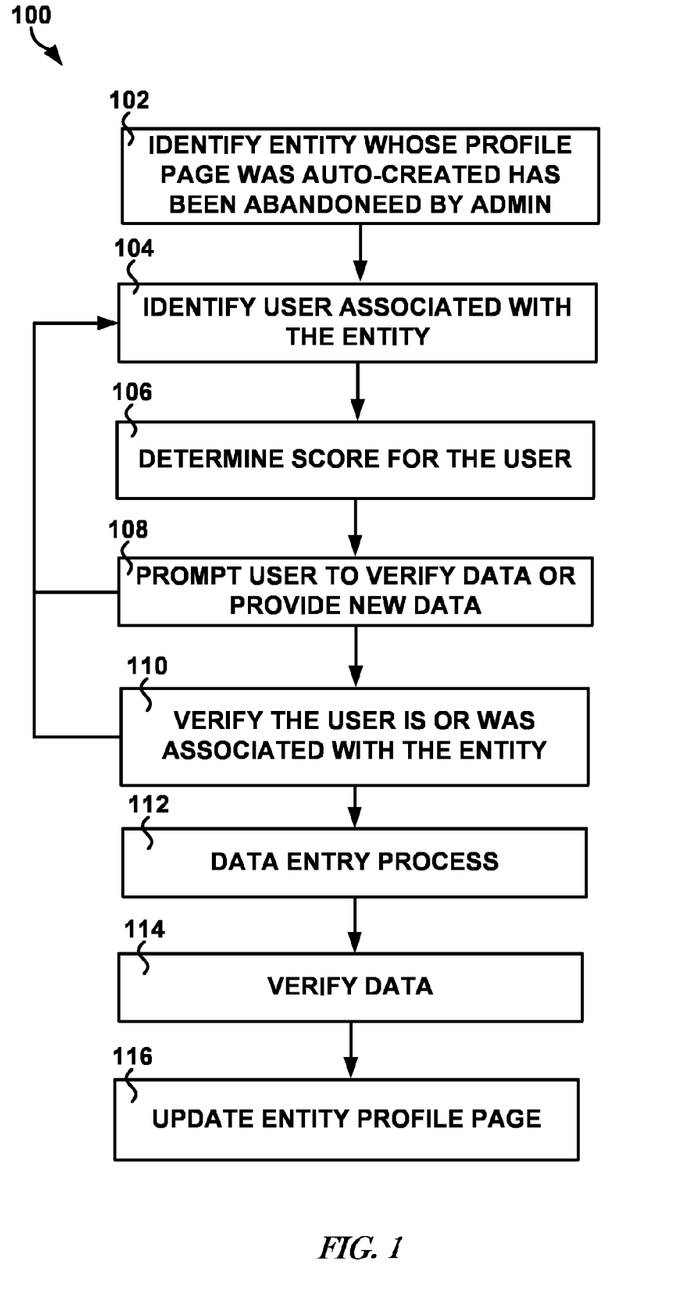
FIG. 1 illustrates, by way of example, a block diagram of an embodiment of a process for crowdsourcing information from a user of a social network site.

FIG. 1 illustrates, by way of example, a flow diagram of an embodiment of a process 100 for crowdsourcing information from a user of a social network site. The process 100 as illustrated includes: identifying an entity whose profile page is auto-created or has been abandoned by an administrator (hereafter "admin"), at operation 102; identifying a user associated with the entity, at operation 104; determining a score for a user identified at operation 104, at operation 106; prompting a user (with a sufficient score) to verify data or provide new data about the entity, at operation 108; verifying the user is or was associated with the entity, at operation 110; directing the user to a data entry process, at operation 112; verifying the data provided by the user, at operation 114 and updating the profile page of the entity with the new data about the entity, at operation 116. Not all operations depicted in FIG. 1 are required and/or the operations may be performed in a different order. For example, operations 106, 110, 112, and 114 are optional. In another example, operation 110 can be performed before operation 108. Other variations on the process 100 are possible.

At operation 102, a profile page that was auto-created or has been abandoned by an admin can be identified (e.g., automatically identified). An auto-created profile page is a profile page that was at least partially created after inferring that the company does not have a profile page. The auto-created profile page can be at least partially created automatically (without human interference) and/or can be created at least partially with human interference. A process to auto-create a profile page of an entity can include analyzing profiles of users of the social networking site, including an employment history of the users as listed in their profile. An entity (e.g., an entity name and/or entity identification number) associated with an employment position in the employment history of the user can be extracted from the profile of the user. Next it can be determined if the entity has a profile page on the social networking site, such as by attempting to look up the entity name or an entity identification number in a database that includes entity names or entity identification numbers. If the entity name or entity identification does not match any entries in the database the entity can be determined to not have a profile page. A profile page can be auto-created for such an entity.

The auto-created profile page can include data about the entity that is gathered (e.g., automatically), such as from the profile(s) of user(s) that include the entity in their profile, from the internet (e.g., an entity website or other website that includes information regarding the entity), crowdsourcing, or other source. An entity with an auto-created profile page can be associated with an entry in a database that indicates the profile page for the entity was auto-created (e.g., profile_autocreated=zero (0) or one (1) or some other indicator). For example, if profile_autocreated is set to one, this can mean that the entity profile page related to the indicator was auto-created. Note that the example uses positive logic. In an embodiment using negative logic, profile_autocreated=0 means that the entity profile page related to the indicator was auto-created. Thus, identifying an entity whose profile page is auto-created can include looking up the profile_autocreated indicator for that entity and determining if the value of the indicator indicates the profile page was auto-created.

Similarly, identifying a company with profile page that has been abandoned can include looking up an indicator related to whether the entity has an active admin. A profile page can be determined to be abandoned by determining that the page has not been updated or accessed by the admin for a specified period of time (e.g., one or more days, weeks, months, etc.). In response to determining that such a condition is met, an indicator (company_admin) can be set to indicate that the page does not have an active admin (company_admin=0). The indicator can be looked up (e.g., queried) to determine if the page has been abandoned.

At operation 104, a user associated with the entity that was identified at operation 102 can be identified. The user can be a current employee (e.g., an employee, contractor, or otherwise perform work for the entity, such as according to their profile). The user can be identified by querying profile data (e.g., profile data in a database, such as the database 204 of FIG. 2) for a user with a profile that includes the entity name, or includes an entity name that is substantially similar to the entity name (e.g., an exact match or within a threshold similarity phonetically or in a string distance between entity names, such as a Levenstein, Hamming, or Jaro-Winkler distance, among other string distance determining algorithms).

In one or more embodiments, a user associated with the entity includes a user with a profile that indicates the user has worked in the same or a similar industry as the industry in which the entity operates. Such users can be identified by querying a database for users with a profile that indicates the user is or was associated with an entity with a same industry identifier or an industry identifier of a closely related industry. Such users can be determined in situations in which there are an insufficient number of users (e.g., a number of users below a specified threshold, such as an integer greater than or equal to one (1)) with the entity in their profile page, an insufficient number of users with a sufficient score (as determined at operation 106 and discussed below, such as a number of users below a specified threshold, such as an integer greater than or equal to one (1)), and/or in addition to the users that include the entity in their profile.

At operation 106, a score can be determined for each of the users identified at operation 104. The score can be determined based on one or more attributes of the user. The one or more attributes can include one or more of the number of connections the user has on the social networking site, a profile completeness score of the user, the title or former title associated with the user while they were associated with the entity, the amount of time the user has worked at/with the entity (e.g., in months, years, weeks, etc.), among other attributes.

The score can include a weighted or un-weighted sum of scores for each attribute to be scored. Different weights can be provided for different attributes based on the importance of the attribute. For example, consider two users (employee one and employee two) who are both employees of the entity that has a profile page that was auto-created. Employee one is a content specialist that has been at the entity for less than a year and employee two is a founder and owner of the entity. The score for employee two can be higher than the score for employee one because, while both employees may be qualified to provide or verify information regarding the entity, the founder and owner may be more likely to respond to a prompt asking the user to provide or verify information regarding the entity. This can be because the founder and owner can have more of a vested interest in the entity than the content specialist. Note that different weights and different scores for different attributes can be specified such that, given the same two employees, the score of the respective employee can be greater or lesser than the other employee.

In another example, consider an employee (employee three) that has a title of manager, a profile that is 30% complete, been associated with the entity for one year, and ten connections on the social network site, and another employee (employee four) that has a title of customer service specialist, a profile that is 100% complete, been associated with the entity for less than a year, and five hundred connections. The score function can be defined as score=weight1*title score+weight2*completeness score+weight3*seniority score+weight4*connections score. By adjusting the weights the scores the relative importance of each attribute can be defined. For example, if weight1 is high relative weight1, the title can have a bigger impact on the overall than the completeness of a user profile. If weight4 is weighted high relative to the other weights, then employee four is more likely to have a higher score than employee three because employee four has many more contacts than employee three. In this manner, attributes that tend to show that the user is active and engaged on the social network site can be used to determine a relative likelihood that the user will respond to a prompt asking the user to provide more information or verify information that has already been provided.

Consider the example just described where weight1 is ten (10), the title score of the manager position is one hundred (100), the title score of the customer service specialist position is fifty (50), weight two is also ten (10), the seniority score associated with one year of seniority is one (1), the seniority score associated with less than one year is zero (0), weight3 is one hundred (100), and weight4 is also ten (10). In this example the seniority of the employee is considered more important than other attributes, since weight3 is high relative to the other weights. With this scoring, the score for employee three is 10*100+10*1+ 10*0.3+10*10=1113, and the score for employee four is 10*50+10*0+10*1.0+10*500=5510. By this scoring rubric, employee four would be determined more likely to provide information through crowdsourcing than employee three.

Regardless of how the score is determined, the score can be compared to a threshold score. If a user does not have a score that is greater than (or equal to) the threshold score, that user can be filtered out from the users that may be targeted to provide or verify information about the entity. If a user has a score that is greater than (or equal to) the threshold score, the employee can be added to a list of one or more users that are candidates for crowdsourcing information about the entity. Labeling a user as a potential candidate for crowdsourcing can include associating an indicator (e.g., crowsdsource=1 or 0 or other indicator) with the user, such as in a profile data database. For example, if crowdsource=0, then the user can be filtered out of the pool of users that are candidates for crowdsourcing. In an embodiment in which the threshold is set at 2000, then employee three would be filtered out of the candidates for crowdsourcing (e.g., crowdsource=0) and employee four would be considered a candidate for crowdsourcing, such as by setting crowdsource=1.

Alternative to determining a score, a crowdsourcing candidate can be identified by following a set of pre-defined rules. For example, a set of rules can be defined as follows: (1) if a user is determined to include the entity in their profile and they are currently employed by the entity, then they are considered a crowdsourcing candidate; (2) if the user is determined to include the entity in their profile and they do not currently work for the entity, then if the title and/or seniority of the user matches a set of pre-defined titles and/or seniority levels then the user is considered a candidate for crowdsourcing; (3) if the entity does not get a sufficient number of crowdsourcing candidates from steps (1) and (2), then users associated with a company in a related field can be identified and if the title and/or seniority of the user matches a set of pre-defined titles and/or seniority levels then the user is considered a candidate for crowdsourcing. Many other rule based crowdsourcing candidate identification schemes can be generated to help narrow the pool of users that crowdsource information to a pool that is likely to provide reliable information and/or respond to a prompt to provide information. The rule-based and the score-based schemes can be combined, such that the title, seniority level, connections, or other attribute of a user is determined at a particular rule and compared to a threshold to determine if the user is a candidate for crowdsourcing.

At operation 108, a user that was determined to be a candidate for crowdsourcing at operation 104 and/or has a sufficient score, can be prompted to provide information about the entity. Prompting a user for information about the entity can be accomplished in a variety of ways, including, but not limited to, an email, an indication on the entity profile page, an indication on the homepage of the user, and/or an indication in response to a user opening a web browser. Prompting one or more users for crowdsourcing can be done individually or in batch. The prompt to the candidate can include text, graphics, a link (e.g., a hyperlink), a control, or the like that indicates that information about the entity is requested from the user. The link can include a link to a process that is a formal process for providing information about the entity. In one or more embodiments, the control can prompt the user to provide specific information about the entity or can ask the user if the user is willing to provide information about the entity.

In an embodiment in which the candidate was contacted individually and the candidate does not provide the requested information, the process 100 can continue at operation 104. In an embodiment in which multiple users were contacted (e.g., in batch at operation 108) and all contacted users have declined to provide the requested information, the process 100 can continue at operation 104. If the candidate provides the requested information or indicates that they are willing to participate in a data entry process, whether in batch or individual processing, the process 100 can continue at operation 110 or 112.

A user responding with requested data can include replying to the email with a specified response (e.g., "YES", as in "I am willing to provide requested data", providing the requested data, or other text), the user clicking on a link provided in the contact (at operation 108), or the user activating a control provided in the contact with the user, among others.

A user declining to provide data can include the user replying to the email with a specified response (e.g., "NO", as in "I am not willing to provide requested data", or other text), the user refraining from clicking on a link provided in the contact (at operation 108) for a specified period of time (e.g., a day, week, month, etc.), the user activating a control provided in the contact that indicates the user declines to provide the specified information, or the user not responding or otherwise interacting with the contact so as to provide no indication of an acceptance or decline to provide the information requested for a specified period of time (e.g., a day, week, month, etc.), among others.

At operation 110, it can be verified that the user is or was associated with the entity that has the auto-created profile page. Such verification can include asking one or more other users associated with the entity (according to their profile page) at or around the same time as the user, whether they know the user or can verify that the user was associated with the entity. If the user is not verified to be associated with the entity, then the process 100 can continue at operation 104. If the user is verified to be associated with the entity, then the process 100 can continue at operation 112.

At operation 112, the user(s) that accepted the invitation to provide data (e.g., such as in response to the contact from operation 108) can be directed to the data entry process. Operation 112 can be accomplished in a variety of ways. In one or more embodiments, the contact with the user (at operation 108) can include a link that directs the user to the data entry process in response to the user activating the link. In one or more other embodiments, the contact with the user (at operation 108) can direct the user to the entity profile page on the social networking site. The entity profile page can include a control (e.g., a button, an active banner, or other control) that, in response to being activated by the user, directs the user to the data entry process. The user may be required to provide the secure token and/or other identifying information to access the data entry process. The secure token can include a hash of a string (e.g., a company identification, name, industry, Uniform Resource Identifier (URI) of an admin claim flow process for the profile page, and/or other string). The user can be required to provide the secure token to gain access to the data entry process. In one or more embodiments, the secure token can be passed between users, such that a user who receives the token from another user, but does not meet the crowdsourcing candidate criteria may try to gain access to the data entry process. To help prevent the user with insufficient criteria from gaining access to the data entry process, a user may also be required to identify themself before gaining access to the data entry process. After the user identifies themself, it can be verified that they are a crowdsourcing candidate, such as by looking up the proper indicator. The control or the link can direct the user to an address (e.g., using a URI, such as a Uniform Resource Locator (URL)) of the data entry process.

The data entry process (at operation 112) can include prompting the user to provide information about the entity associated with the profile page, such as by filling in a form (e.g., text boxes with prompts), or responding to questions in a yes/no format. An example of a yes/no question is "is this the correct logo for the company?". If the user responds with "No" then the user can be prompted to upload a new logo for the company. In response to the user providing information regarding the entity and/or certifying that the data is accurate (e.g., to the best of their knowledge) the data can be stored as potential data or the profiled page of the entity can be updated to include the data provided.

In one or more embodiments, a user can provide information about an entity for the profile page of that entity that can include one or more of the entity name, the industry of the entity (e.g., as selected from a list of pre-defined industry descriptions or categories), a size of the entity (e.g., as selected from a list of pre-defined sizes or groups of sizes), a check box validating that the data is accurate, a logo for the entity that can be displayed on the profile page, a description of the entity (e.g., a mission statement of the entity, a statement regarding the operations of the entity, or other pertinent description of the entity), an address of the entity (e.g., city, state, zip code, country, etc.), the business type of the entity, and the year the entity was founded, among other potential data regarding the entity. In the data entry process, the user can be prompted to provide a hero image (i.e. an image that is typically prominently displayed near the top and center of a web page) that can serve as a banner for the entity on the entity profile page. Updating the entity profile page, at operation 116, can include using a request (e.g., an Asynchronous JavaScript and Extended Markup Language (AJAX) post request) with data (e.g., JavaScript Object Notation (JSON) data) to the database server. Alternatively a call can be made to a media uploader that receives a URI of an uploaded image that can be stored to the entity profile page data on the database, such as by using an AJAX post request with JSON data that includes the URI as part of the JSON data.

A user may leave (e.g., click-out of) the data entry process prior to completing the process. To help ensure that the data entered into the data entry process is saved, the data entered by the user can be saved as it is entered or as each field is completed. For example, if the user completes the "name" field, a request to update the entity data in a database can be issued. The request can include an AJAX Post request that includes data formatted in a JSON format, An example of such JSON formatted data is provided:

```
"entryPage":
{
"name": "Bluth Company",
"website" : "bluth.com",
"email": "@bluth.com",
"industry": "ACCOUNTING",
"employeeCount": "2-3 Employees"
}
```

In an embodiment in which multiple users have been contacted to provide the same information, a conflict between data provided by the users can occur. In one or more embodiments, to help avoid a conflict, only a user with the secure token can be allowed to gain access to the data entry process.

In one or more embodiments, in response to the user providing the secure token, the data entry process can be locked to prevent other users from entering data into the data entry process. In one or more embodiments, the secure token can be passed between users, such that a user who receives the token from another user, but does not meet the score threshold (e.g., as determined at operation 106) may try to gain access to the data entry process. To help prevent this, a user may also be required to identify themself before gaining access to the data entry process, such as to verify that they are a qualified candidate for crowdsourcing information about the entity.

It may be desired to allow a user to nominate a second user as a candidate to provide information for the profile page (e.g., by forwarding the secure token to another user). In such embodiments, the second user can provide the secure token (as forwarded to them from the first user). It can be determined that the second user does not have an indicator that indicates the second user is a candidate for crowdsourcing information for the entity, and the indicator can be changed to indicate that the second user is such a candidate. Then the second user can be provided access to the data entry process.

A data conflict between data provided by multiple users can be handled in a variety of other ways. One such example includes receiving responses to the same prompt from a variety of users. The response that is the most common can be used as the data for the profile page. Another such example (not necessarily mutually exclusive example) includes an administrator of the profile page overriding data on the profile page or choosing between responses that were provided from the users.

A security measure can be put in place to help ensure the data provided by the user is accurate. Consider a situation in which a user has been given crowdsourcing candidate status for an entity, the user is no longer associated with the entity, and the user did not leave the entity on favorable terms. In such a situation a user may provide intentionally erroneous information in response to the prompt for information. In one or more embodiments, a response from a crowdsourcing candidate can be filtered through one or more spam filters. Those responses determined to be spam can be removed or disregarded, while those that are determined to not be spam can be stored as potentially valid responses. At operation 114, the data provided can be verified, such as to help ensure that the data is accurate. An example of such a security measure includes verifying that the user still works at the entity by determining, such as by according to the user's profile or asking one or more other users to verify that the user still works for the entity. Another example of such a security measure includes requiring the user to check a box certifying that the data they provided is accurate to the best of their knowledge. Another such security measure includes asking a plurality of users the same question and using, for example, the most popular response as the actual answer. Another such security measure can include asking another one or more users associated with the entity to verify that the data provided is accurate. For example, if a user prompted to provide a description of the services or products offered by the entity responds with "X", then another one or more users, such as users determined to be associated with the entity, can be prompted to the verify if the description "X" is accurate. If "X" is determined to be accurate then the entity's profile can be updated to include the description "X", such as at operation 116.

Figure 2:
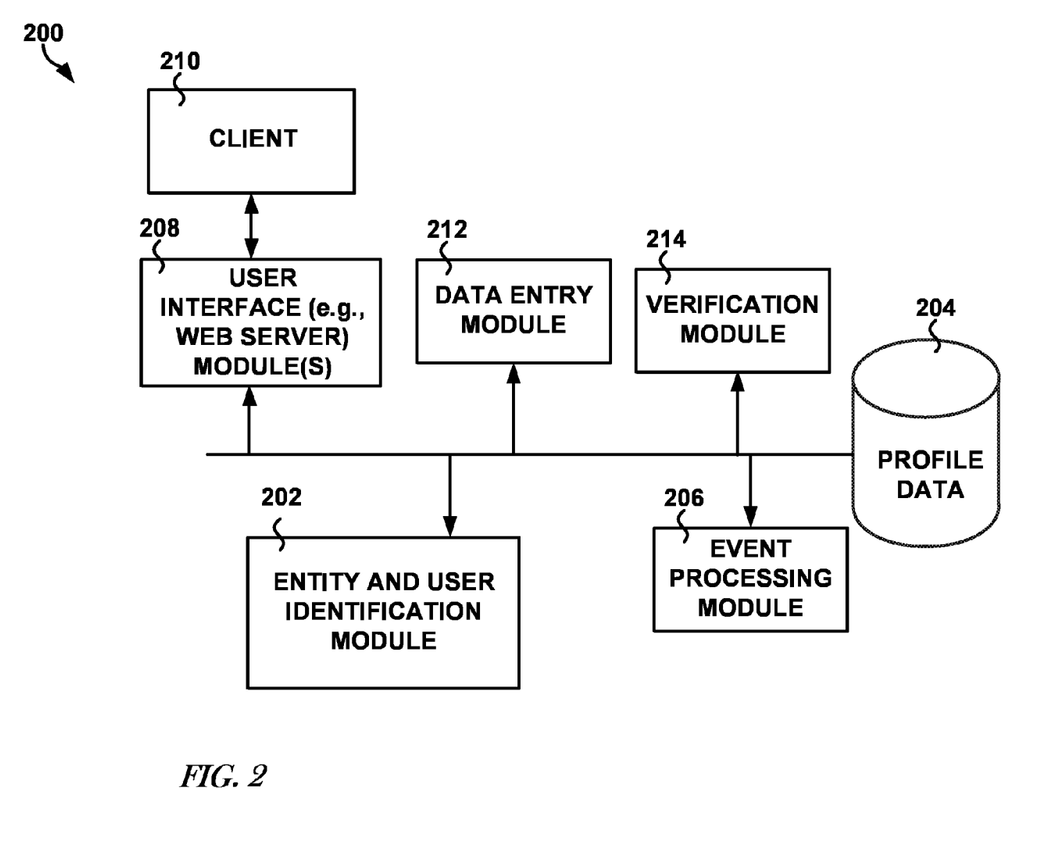
FIG. 2 illustrates, by way of example, a block diagram of an embodiment of a system for crowdsourcing entity information.

FIG. 2 illustrates, by way of example, a block diagram of an embodiment of a system 200 for crowdsourcing information about an entity with an auto-created profile page. As illustrated, the system 200 includes an entity and user identification module 202, a profile data database 204, an event processing module 206, a user interface (UI) module 208, a client 210, a data entry module 212, and a verification module 214.

The entity and user identification module 202 identifies companies that have auto-created profile pages and identifies one or more users that are candidates for crowdsourcing data. The entity and user identification module 202 performs the operations at 102, 104, and 106. The module 202 can accomplish this by querying the profile data database 204 for an entity with an indicator (e.g., profile_autocreated) that is set to a value that indicates the entity profile page was auto-created. In one or more embodiments, the identification module 202 queries the profile data database 204 for entities that are both auto-created and have more than a threshold number of people with a profile that lists the entity in their profile.

To identify a user that is a candidate for crowdsourcing, the module 202 can query the profile data database 204 for users that fare currently associated with the entity, were previously associated with the entity, work in an industry that is related to the entity, and/or worked in an industry that is related to the entity. The module 202 can score the returned users based on one or more attributes of the user profile data (e.g., the title of the user at the entity they are currently or formerly associated with, the number of connections of the user, the profile completeness of the user, the longevity of the user at the entity, and/or other attributes). The module 202 can compare the score to a threshold, such as to filter out users that are not likely to provide information based on the score. The module 202 can issue a post request to the profile data database 204 to set an indicator that indicates whether or not a user is a candidate for crowdsourcing information (e.g., crowdsource=0 or 1). For example, if a user's score is below the threshold, the module 202 can issue a request to set "crowdsource=0" into the profile of that user so as to indicate that user is not likely to respond with requested information. Alternatively, if the user's score is above the threshold, the module 202 can issue a post request to set "crowdsource=0" into the profile of that user so as to indicate that user is likely to provide requested information.

The profile data database 204 can include one or more relational databases that include member profile data related to a non-user entity (e.g., a company, school, charity, non-profit organization, or other non-individual user entity) that has a profile page on a social networking site. The profile data of an individual user can include current and past employment positions of the user, title(s) of employment position(s), number of contacts, and/or profile completeness, among other information. The profile data can be indexed according to user/entity or other indexing scheme that allows the data to be retrieved (e.g., queried and returned) by the module 202 and/or 206. In one or more embodiments, the entity and potential admin identification module 202 and the database 204 can be implemented as a Hadoop® cluster. The entity and crowdsourcing candidate (e.g., a user with a score above the threshold) identified by the module 202 can be stored in a database (e.g., the profile data database 204) or other database accessible by the event processing module 206.

In one or more embodiments, the event processing module 206 initiates contact with those users determined to be candidates for crowdsourcing. The event processing module can perform the operation 108 of the process of FIG. 1. The event processing module 206 can provide the client 210, through the UI module 208 with at least some of the data (e.g., password, encryption key, decryption key, secure token, or the like) needed to access the data entry module 214.

In one or more embodiments in which the entity and crowdsourcing candidate are determined online, the event processing module 206 can query the profile data database to determine if the user is a candidate for crowdsourcing. If the user is not a candidate, the event processing module 206 does not perform further operation. If the user is a candidate, the event processing module 206 can contact the user (e.g., initiate an email correspondence, provide a prompt (e.g., a control) to the user through the UE module 208, or other contact). In an embodiment in which users are batch processed, the user can be added to a notification list, such as by the module 202 that details users that will receive a contact asking the user to provide information for the entity.

In one or more embodiments in which the entity and/or candidate are determined offline, the event processing module 206 can look up the identified entity and candidate at the location at which the data is stored (e.g., on the notification list, such as in the profile data 204). No matter how the candidate user and the entity are identified, the event processing module 206 can contact the candidate user to encourage or ask the user to provide information about the entity (e.g., new information about the entity or to verify information about the entity).

In one or more embodiments, the event processing module 206 detects when a user with sufficient credentials (e.g., crowdsource=0) visits the social networking site, such as a specific page of the social networking site. The event processing module 206 can modify the site as displayed to the user, such as by adding a graphic that is displayed when the candidate visits the site. The graphic illustrates or otherwise conveys to the user that the user is a candidate for crowdsourcing and/or asks the user to provide information about the entity.

The user interface module (e.g., a web server) 208 can receive requests from various client-computing devices (e.g., client 210), and communicate appropriate responses to the requesting client. The client 210 can include a device, such as a laptop, tablet, phone, Smartphone, desktop, Personal Digital Assistant (PDA), e-reader, or other computing device, such as a computing device capable of connecting to the internet. The client 210 can communicate with a social networking system (see FIG. 3), which can include the entity and user identification module 202, the profile data database 204, the event processing module 206, the data entry module 212, and/or the verification module 214. The client 210 can communicate using the user interface (UI) module 208. For example, the UI module 208 may receive requests from the client 210 in the form of Hypertext Transport Protocol (HTTP) request, File Transfer Protocol (FTP), Transmission Control Protocol (TCP)/Internet Protocol (IP), Simple Object Access Protocol (SOAP), or other request.

The data entry module 212 directs a user through a data entry process and issues post requests to the database 204 to store the data received through the data entry process. The data entry module 212 can direct the UI 208 to prompt the user to provide information about the entity associated with the profile page of which information is being requested. The data entry module 212 can direct the UI module 208 to prompt the user for entity and/or user information, such as the entity name, the industry of the entity (e.g., as selected from a list of pre-defined industry descriptions or categories), a size of the entity (e.g., as selected from a list of pre-defined sizes or groups of sizes), a check box validating that the data provided is accurate, a logo for the entity that can be displayed on the profile page, a description of the entity (e.g., a mission statement of the entity, a statement regarding the operations of the entity, or other pertinent description of the entity), an address of the entity (e.g., city, state, zip code, country, etc.), the business type of the entity, and the year the entity was founded, among other data regarding the entity.

The data entry module 212 can include a security mechanism that allows only those users that are identified as candidates for crowdsourcing to go through the data entry process. The data entry module 212 can require a user to provide a secure token and/or identify themselves (e.g., with a username, password, or other identifying information) before gaining access to the data entry process. In one or more embodiments in which a user enters the data entry process by clicking on a secure link provided in the contact, the user can be automatically directed to the data entry process without having to provide additional authentication information.

As was discussed previously, a candidate for crowdsourcing may leave (e.g., click-out of) the data entry process prior to providing all information requested from the user. To help ensure that the data entered in the data entry process is saved, the data entered by the user can be saved as it is entered or as each field is completed. For example, if the user completes the "name" field, a request to update the entity data in the database 204 can be issued by the data entry module 212.

The data entry module 212 can issue a write request to the database 204, in response to receiving data from a user. The write request can include an AJAX post request with JSON data, in one or more embodiments. In an embodiment in which data is to be verified before it is written to the profile, the data entry module can write the data to the database 204 in such a way as to not associate the data with the profile of the entity and to make the data available to the verification module 214.

The verification module 214 can verify information provided through the data entry process. The verification module 214 can compare data provided by multiple users to determine if the data is accurate. For example, if multiple users provide the same information about an entity, then it is more likely that the data provided is accurate as compared to information provided by only a single user. In another example, if a user validates data provided by another user, then the data provided by the user is more likely accurate as compared to data provided without verification. In response to data being verified, the verification module 214 can issue a write request to the database 204 to write the data to the entity's profile.

Figure 3:
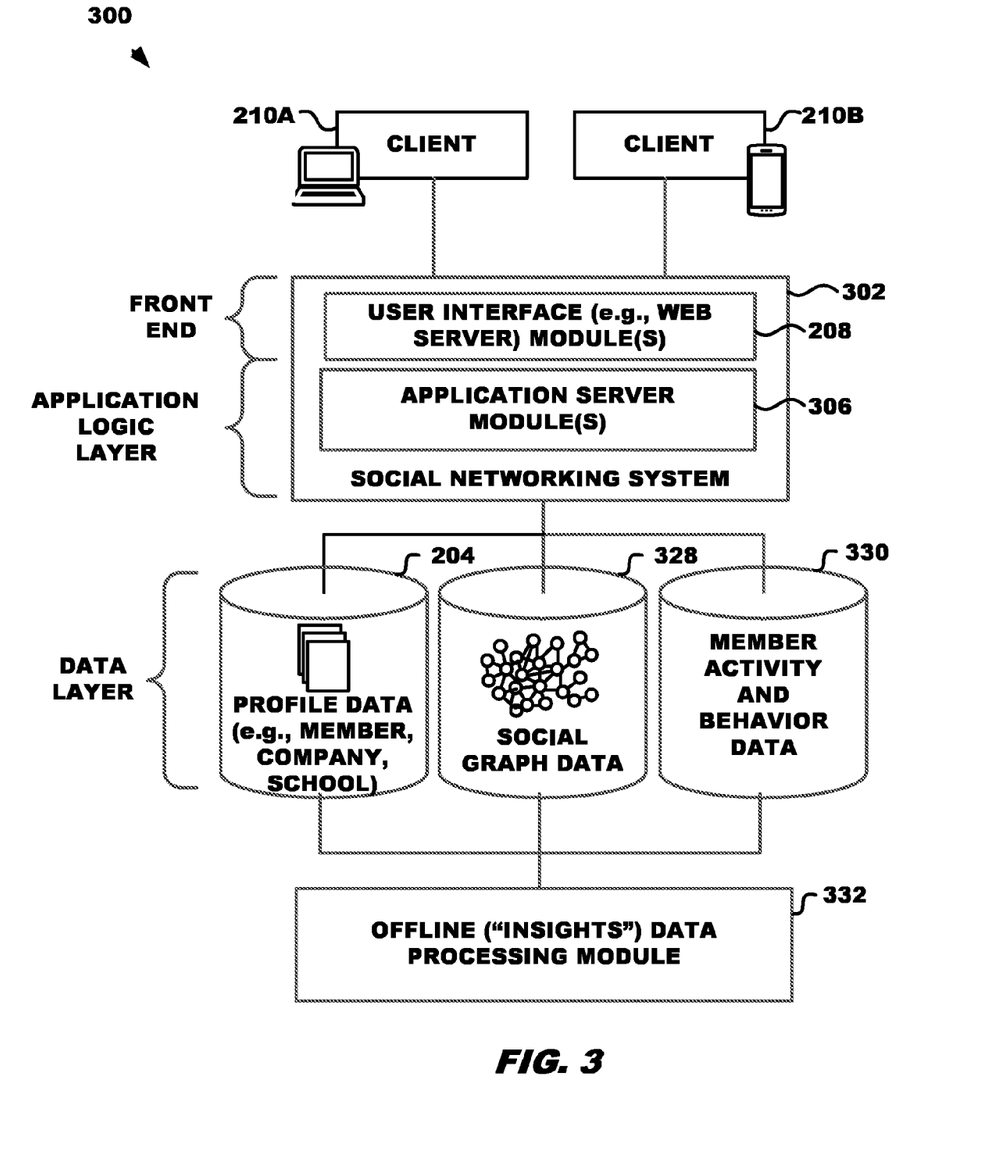
FIG. 3 illustrates, by way of example, a block diagram of an embodiment of a computer network environment in which the systems and methods discussed herein can be deployed and/or performed.

FIG. 3 illustrates, by way of example, a block diagram of an embodiment of a computer network environment 300 in which the systems and methods discussed herein can be deployed and/or performed. The system 200 can be deployed or the process 100 can be implemented using the environment 300. In one or more embodiments, the entity and user identification module 202 can be implemented in an offline process, such as by incorporating the module 202 in the offline data processing module 332. In one or more other embodiments, the module 202 can be implemented online, such as in application server module(s) 306. The event processing module 206, the data entry module 212, and the verification module 214 can be implemented in the application server module(s) 306. The verification module 214 can be implemented in the offline data processing module 332.

The computer network environment 300 can include a social networking system 302 that includes one or more application server modules 306 that provide any number of applications and services that leverage the social graph data database 328 maintained by the social networking system 302. For example, the social networking system 302 may provide a photo sharing application, a job posting and browsing service, a question-and-answer service, and so forth.

The social network environment 300 can provide a social networking service. A social networking service is an online service, platform and/or site that allows users of the service to build or reflect social networks or social relations among members. Typically, users construct profiles, which may include characteristics (e.g., personal information), such as the member's name, contact information, employment information, photographs, personal messages, status information, links to web-related content, blogs, and so on. In order to build or reflect these social networks or social relations among members, the social networking environment 300 allows members to identify, and establish links or connections with other members. For instance, in the context of a business networking service (a type of social networking service), a person may establish a link or connection with his or her business contacts, including work colleagues, clients, customers, personal contacts, and so on. With a social networking service, a person may establish links or connections with his or her friends, family, or business contacts. While a social networking service and a business networking service may be generally described in terms of typical use cases (e.g., for personal and business networking respectively), it will be understood by one of ordinary skill in the art with the benefit of Applicant's disclosure that a business networking service may be used for personal purposes (e.g., connecting with friends, classmates, former classmates, and the like) as well as, or instead of business networking purposes and a social networking service may likewise be used for business networking purposes as well as or in place of social networking purposes.

As shown in FIG. 3, the front end includes the UI module 208 and the client(s) 210A and 210B. The clients 210A-B are specific instances of the client 210.

The application logic layer can include various application server modules 306, which, in conjunction with the UI module 208, generate various UIs (e.g., web pages) with data retrieved from one or more sources of various data sources in the data layer. In some embodiments, individual application server modules 306 can be used to implement the functionality associated with various applications, services and/or features of the social networking environment 300. For instance, a social networking service may provide a broad variety of applications and services, to include the ability to search for and browse profile pages, job listings, or news articles. Additionally, applications and services may allow users to share content with one another, for example, via email, messages, and/or content postings (sometimes referred to as status updates, such as on a profile page) via a data feed (e.g., specifically tailored) to a user. The application server modules 306 can provide the functionality that crowdsources information from users of the social networking service 302.

As shown in FIG. 3, the data layer includes several databases, such as the database 204 for storing profile data, including both user profile data as well as profile data for various entities (e.g., companies, schools, non-profit organizations, government organizations, and other organizations) represented in the social graph maintained by the social networking service, such as in the social graph data database 328. Consistent with some embodiments, when a person initially registers to become a user of the social networking service, the person can be prompted to provide some personal information, such as his or her name, age (e.g., birthdate), gender, interests, contact information, home town, address, the names of the user's spouse and/or family users, educational background (e.g., schools, majors, matriculation and/or graduation dates, etc.), employment history, skills, professional organizations, and so on. This information, generally referred to as user profile information or user characteristic(s), is stored, for example, in the database 204.

Similarly, when a representative of an organization initially registers the organization with the social networking service (e.g., represented by the social networking system 302), the representative may be prompted to provide certain information about the organization. This information—generally referred to as entity profile information—may be stored, for example, in the database 204 or another database (not shown). With some embodiments, the profile data may be processed (e.g., in the background or offline, by the offline data processing module 332) to generate various derived profile data. For example, if a user has provided information about various job titles the user has held with the same or different companies, or for how long, this information can be used to infer or derive a user profile attribute indicating the user's overall seniority level, or seniority level within a particular entity. With some embodiments, importing or otherwise accessing data from one or more externally hosted data sources may enhance profile data for both users and organizations. For instance, with companies in particular, financial data may be imported from one or more external data sources, and made part of an entity's profile. Another example can include importing information regarding an entity that has an auto-created profile page.

Once registered, a user may invite other users, or be invited by other users, to connect via the environment 300. A "connection" may require a bi-lateral agreement by the users, such that both users acknowledge the establishment of the connection. Similarly, with some embodiments, a user may elect to "follow" another user. In contrast to establishing a connection, the concept of "following" another user typically can be a unilateral operation, and at least with some embodiments, does not require acknowledgement or approval by the user that is being followed. When one user follows another user, the user who is following may receive content postings, status updates, or other content postings published by the user being followed, or relating to various activities undertaken by the user being followed. Similarly, when a user follows an organization, the user becomes eligible to receive content postings published on behalf of the organization and/or system or service-generated content postings that relate to the organization. For instance, messages or content postings published on behalf of an organization that a user is following will appear in the user's personalized feed. In any case, the various associations and relationships that the users establish with other users, or with other entities and objects, can be stored and maintained within the social graph data database 328.

As users interact with the various applications, services, or content made available via the environment 300, the users' behavior (e.g., content viewed, links selected, etc.) may be monitored and information concerning the users' behavior may be stored, for example, in the user activity and behavior data database 330. This information may be used to infer a user's intent and/or interests, and to classify the user as being in various categories. For example, if the user performs frequent searches of job listings, thereby exhibiting behavior indicating that the user is a likely job seeker, this information can be used to classify the user as a job seeker. This classification can then be used as an attribute or characteristic. The attribute or characteristic can be used by others to target the user for receiving advertisements, messages, content postings, or a recommendation. Accordingly, an entity that has available job openings can publish a content posting that is specifically directed to certain users (e.g., users) of the social networking service who are likely job seekers, and thus, more likely to be receptive to recruiting efforts.

Figure 4:
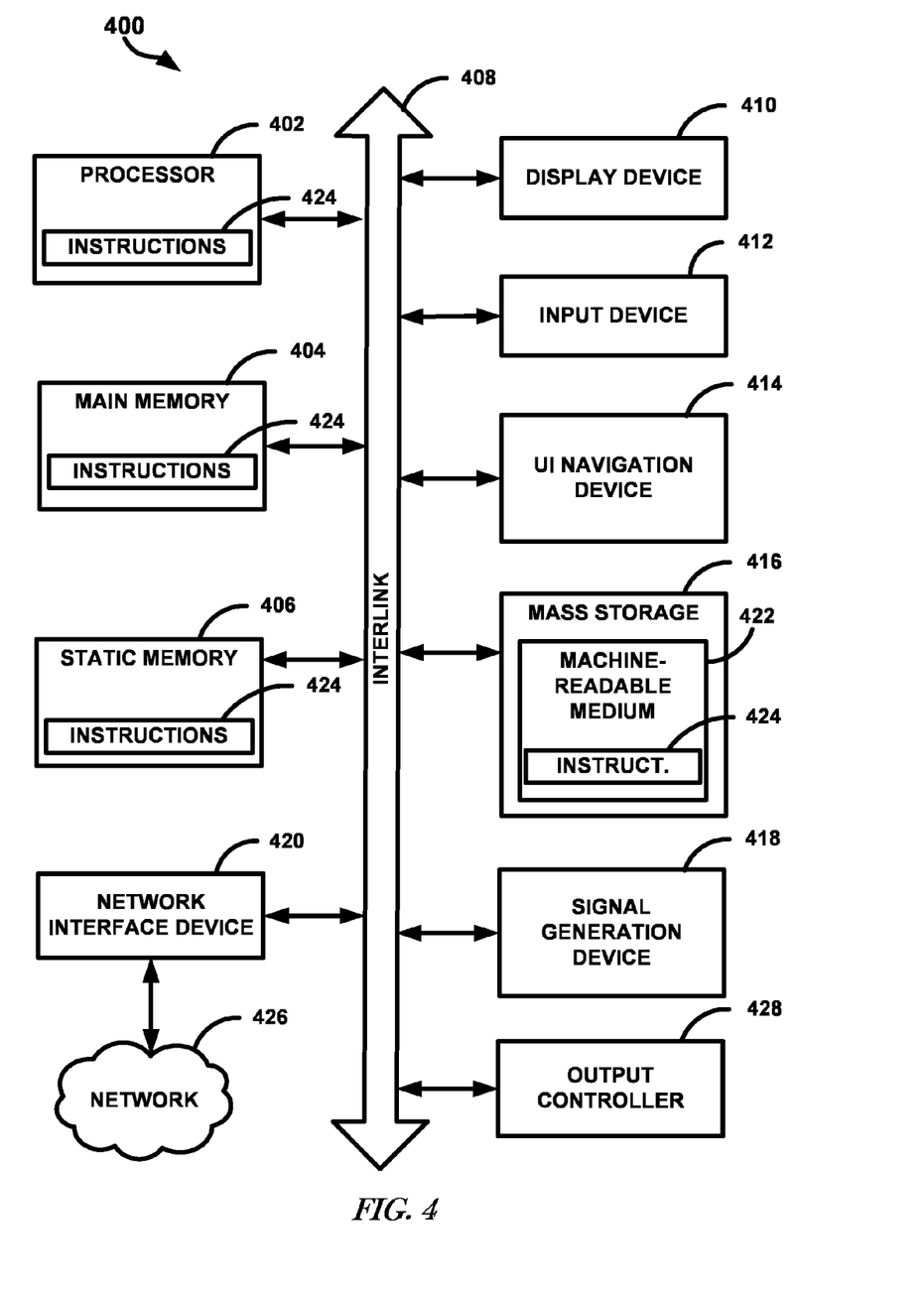
FIG. 4 illustrates, by way of example, a block diagram of an example of a device upon which any of one or more processes (e.g., methods) discussed herein can be performed.

FIG. 4 illustrates, by way of example, a block diagram of an example of a device 400 upon which any of one or more processes (e.g., methods) discussed herein can be performed. The device 400 (e.g., a machine) can operate so as to perform one or more of the programming or communication processes (e.g., methodologies) discussed herein. In some examples, the device 400 can operate as a standalone device or can be connected (e.g., networked) to one or more modules, such as the entity and user identification module 202, the event processing module 206, the UI module 208, the data entry module 212, the verification module 214, the client 210 (e.g., the client 210A and/or 210B), the application server module(s) 306, and/or the offline data processing module 332. An item of the system 200 or 300 can include one or more of the items of the device 400. For example, one or more of the entity and user identification module 202, the profile data database 204, the event processing module 206, the UI module 208, the data entry module 212, the verification module 214, the client 210 (e.g., the client 210A and/or 210B), the application server module(s) 306, the offline data processing module 332, the social graph data database 328, and the member activity and behavior data 330 can include one or more of the items of the device 400.

Embodiments, as described herein, can include, or can operate on, logic or a number of components, modules, or mechanisms. Modules are tangible entities (e.g., hardware) capable of performing specified operations when operating. A module includes hardware. In an example, the hardware can be specifically configured to carry out a specific operation (e.g., hardwired). In an example, the hardware can include configurable execution units (e.g., transistors, logic gates (e.g., combinational and/or state logic), circuits, etc.) and a machine (e.g., a computer) readable medium containing instructions, where the instructions configure the execution units to carry out a specific operation when in operation. The configuring can occur under the direction of the executions units or a loading mechanism. Accordingly, the execution units are communicatively can be coupled to the computer readable medium when the device is operating. In this example, the execution units can be a user of more than one module. For example, under operation, the execution units can be configured by a first set of instructions to implement a first module at one point in time and reconfigured by a second set of instructions to implement a second module.

Device (e.g., computer system) 400 can include a hardware processor 402 (e.g., a central processing unit (CPU), a graphics processing unit (GPU), a hardware processor core, processing circuitry (e.g., logic gates, multiplexer, state machine, a gate array, such as a programmable gate array, arithmetic logic unit (ALU), or the like), or any combination thereof), a main memory 404 and a static memory 406, some or all of which can communicate with each other via an interlink (e.g., bus) 408. The device 400 can further include a display unit 410, an input device 412 (e.g., an alphanumeric keyboard), and a user interface (UI) navigation device 414 (e.g., a mouse). In an example, the display unit 410, input device 412 and UI navigation device 414 can be a touch screen display. The device 400 can additionally include a storage device (e.g., drive unit) 416, a signal generation device 418 (e.g., a speaker), and a network interface device 420. The device 400 can include an output controller 428, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 416 can include a machine readable medium 422 on which is stored one or more sets of data structures or instructions 424 (e.g., software) embodying or utilized by any one or more of the techniques or functions described herein. The instructions 424 can also reside, completely or at least partially, within the main memory 404, within static memory 406, or within the hardware processor 402 during execution thereof by the device 400. In an example, one or any combination of the hardware processor 402, the main memory 404, the static memory 406, or the storage device 416 can constitute machine readable media. The machine readable medium does not include signals per se.

While the machine readable medium 422 is illustrated as a single medium, the term "machine readable medium" can include a single medium or multiple media (e.g., a centralized or distributed database, and/or associated caches and servers) configured to store the one or more instructions 424. The term "machine readable medium" can include any tangible medium that is capable of storing, encoding, or carrying instructions for execution by the device 400 and that cause the device 400 to perform any one or more of the techniques (e.g., processes) of the present disclosure, or that is capable of storing, encoding or carrying data structures used by or associated with such instructions. The term "machine-readable medium" shall accordingly be taken to include, but not be limited to, solid-state memories, and optical and magnetic media. Specific examples of machine-readable media can include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 424 can further be transmitted or received over a communications network 426 using a transmission medium via the network interface device 420 utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 420 can include one or more physical jacks (e.g., Ethernet, coaxial, or phone jacks) or one or more antennas to connect to the communications network 426. In an example, the network interface device 420 can include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the device 400, and includes digital or analog communications signals or other intangible medium to facilitate communication of such software.

Examples and Notes

The present subject matter can be described by way of several examples.

Example 1 can include or use subject matter (such as an apparatus, a method, a means for performing acts, or a machine readable medium including instructions that, when performed by the machine, can cause the device to perform acts), such as can include or use identifying a first entity has an auto-created profile on a social network site or has a profile page that has been abandoned by an administrator of the profile page, identifying one or more users of the social network site associated with the first entity including determining the one or more users includes the first entity in their profile or includes a second entity in their profile where the second entity includes an industry identifier that matches an industry identifier of the first entity, prompting a user of the one or more users determined to be associated with the first entity to verify data about the first entity in the auto-created profile or provide new data about the first entity, and updating the auto-created profile of the first entity in response to the one or more members confirming that the prior data is incorrect or providing new data about the first entity.

Example 2 can include or use, or can optionally be combined with the subject matter of Example 1, to include or use, determining if the first entity referenced in a profile of a user of the one or more user has a profile and in response to determining the first entity does not have a profile, automatically producing the profile for the first entity to create the auto-created profile.

Example 3 can include or use, or can optionally be combined with the subject matter of at least one of Examples 1-2 to include or use, determining which user of the determined one or more users is likely to respond to the prompting by determining a weighted sum of one or more attributes for each of the one or more users and prompting only users with a weighted sum above a specified threshold.

Example 4 can include or use, or can optionally be combined with the subject matter of at least one of Examples 1-3 to include or use, wherein the instructions for determining one or more users of the social network site associated with the first entity include instructions for determining the one or more users includes the first entity in their profile.

Example 5 can include or use, or can optionally be combined with the subject matter of at least one of Examples 1-3 to include or use, wherein the determined one or more users of the social network site are a former or current employee of the second entity and the second entity includes an industry identifier that is the same as an industry identifier of the first entity.

Example 6 can include or use, or can optionally be combined with the subject matter of at least one of Examples 1-5 to include or use, before prompting a user of the one or more users associated with the first entity to verify data about the first entity in the auto-created profile or provide new data about the first entity, verifying the one or more users are or were associated with the first entity by asking one or more other users of the social network site that are or were associated with the first entity, according to their respective profile on the social network site at the same time as the user, if they know the user.

Example 7 can include or use, or can optionally be combined with the subject matter of at least one of Examples 1-6 to include or use, wherein the instructions for prompting a user of the one or more users associated with the first entity to verify data about the first entity in the auto-created profile or provide new data about the first entity include instructions for prompting the user to verify data about the first entity in the auto-created profile.

Example 8 can include or use, or can optionally be combined with the subject matter of at least one of Examples 1-7 to include or use, wherein prompting a user of the one or more users associated with the first entity to verify data about the first entity in the auto-created profile or provide new data about the first entity include instructions for prompting the member to provide new data about the first entity.

Example 9 can include or use, or can optionally be combined with the subject matter of at least one of Examples 1-8 to include or use, wherein the instructions for prompting the user of the one or more users include instructions to prompt a plurality of users for new data about the first entity, comparing responses from the plurality of users, and the instructions for updating the auto-created profile include instructions to update the data of the profile with the most popular response from the plurality of users.

Example 10 can include or use, or can optionally be combined with the subject matter of at least one of Examples 1-9 to include or use, prompting a user of the determined one or more users to verify data provided by another user is accurate and wherein the instructions for updating the auto-created profile include instructions to update the data of the profile only if the another user verifies the data is accurate.

Example 11 can include or use subject matter (such as an apparatus, a method, a means for performing acts, or a machine readable medium including instructions that, when performed by the machine, can cause the device to perform acts), such as can include or use identifying a first entity has an auto-created profile on the social network site or has a profile page that has been abandoned by an administrator of the profile page, identifying one or more users of the social network site associated with the first entity including determining the one or more users includes the first entity in their profile or includes a second entity in their profile where the second entity includes an industry identifier that matches an industry identifier of the first entity, prompting a user of the one or more users determined to be associated with the first entity to verify data about the first entity in the auto-created profile or provide new data about the first entity, and updating the auto-created profile of the first entity in response to the one or more members confirming that the prior data is incorrect or providing new data about the first entity.

Example 12 can include or use, or can optionally be combined with the subject matter of Example 11 to include or use determining if the first entity referenced in a profile of a user of the one or more user has a profile, and in response to determining the first entity does not have a profile, automatically producing the profile for the first entity to create the auto-created profile.

Example 13 can include or use, or can optionally be combined with the subject matter of at least one of Examples 11-12 to include or use determining which user of the determined one or more users is likely to respond to the prompting by determining a weighted sum of one or more attributes for each of the one or more users and prompting only users with a weighted sum above a specified threshold.

Example 14 can include or use, or can optionally be combined with the subject matter of at least one of Examples 11-13 to include or use, wherein determining one or more users of the social network site associated with the first entity includes determining the one or more users includes the first entity in their profile.

Example 15 can include or use, or can optionally be combined with the subject matter of at least one of Examples 11-14 to include or use, wherein the determined one or more users of the social network site are a formerly or currently associated with the second entity and the second entity includes an industry identifier that is the same as an industry identifier of the first entity.

Example 16 can include or use subject matter (such as an apparatus, a method, a means for performing acts, or a machine readable medium including instructions that, when performed by the machine, can cause the device to perform acts), such as can include or use one or more hardware processors, one or more memories communicatively coupled to the one or more hardware processors, the one or more memories including stored thereon, the one or more memories further including instructions stored thereon, which when executed by the one or more processors, cause the one or more processors to perform operations for crowd-sourcing entity information, the operations comprising identifying a first entity has an auto-created profile on the social network site or has a profile page that has been abandoned by an administrator of the profile page, identifying one or more users of the social network site associated with the first entity including determining the one or more users includes the first entity in their profile or includes a second entity in their profile where the second entity includes an industry identifier that matches an industry identifier of the first entity, prompting a user of the one or more users determined to be associated with the first entity to verify data about the first entity in the auto-created profile or provide new data about the first entity, and updating the auto-created profile of the first entity in response to the one or more members confirming that the prior data is incorrect or providing new data about the first entity.

Example 17 can include or use, or can optionally be combined with the subject matter of Example 16 to include or use wherein the operations further comprise, before prompting a user of the one or more users associated with the first entity to verify data about the first entity in the auto-created profile or provide new data about the first entity, verifying the one or more users of the first entity are or were associated with the first entity by asking one or more other users of the social network site that are or were associated with the first entity, according to their respective profile on the social network site at the same time as the user, if the determined user is or was associated with the first entity.

Example 18 can include or use, or can optionally be combined with the subject matter of at least one of Examples 16-17 to include or use, wherein prompting a user of the one or more users associated with the first entity to verify data about the first entity in the auto-created profile or provide new data about the first entity includes prompting the user to verify data about the first entity in the auto-created profile.

Example 19 can include or use, or can optionally be combined with the subject matter of at least one of Examples 16-18 to include or use, wherein prompting a user of the one or more users associated with the first entity to verify data about the first entity in the auto-created profile or provide new data about the first entity includes prompting the member to provide new data about the first entity.

Example 18 can include or use, or can optionally be combined with the subject matter of at least one of Examples 16-19 to include or use, wherein prompting the user of the one or more users includes prompting a plurality of users for new data about the first entity, the operations further include comparing responses from the plurality of users, and updating the auto-created profile includes updating the data of the profile with the most popular response from the plurality of users.

The above Description of Embodiments includes references to the accompanying figures, which form a part of the detailed description. The figures show, by way of illustration, specific embodiments in which methods, apparatuses, and systems discussed herein can be practiced. These embodiments are also referred to herein as "examples" or "embodiments". Such embodiments (e.g., examples) can include elements in addition to those shown or described. However, the present inventors also contemplate embodiments in which only those elements shown or described are provided. Moreover, the present inventors also contemplate embodiments using any combination or permutation of those elements shown or described (or one or more aspects thereof), either with respect to a particular embodiment (or one or more aspects thereof), or with respect to other embodiments (or one or more aspects thereof) shown or described herein.

The flowchart and block diagrams in the FIGS. illustrate the architecture, functionality, and operation of possible implementations of systems, methods and computer program products according to various aspects of the present disclosure. In this regard, each block in the flowchart or block diagrams can represent a module, segment, or portion of code, which comprises one or more executable instructions for implementing the specified logical function(s). It should also be noted that, in some alternative implementations, the functions noted in the block can occur out of the order noted in the figures. For example, two blocks shown in succession may, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The functions or techniques described herein can be implemented in software or a combination of software and human implemented procedures. The software can consist of computer executable instructions stored on computer readable media such as memory or other type of storage devices. The term "computer readable media" is also used to represent any means by which the computer readable instructions can be received by the computer, such as by different forms of wired or wireless transmissions. Further, such functions correspond to modules, which are software, hardware, firmware or any combination thereof. Multiple functions can be performed in one or more modules as desired, and the embodiments described are merely examples. The software can be executed on a digital signal processor, ASIC, microprocessor, or other type of processor operating on a computer system, such as a personal computer, server or other computer system.

The above description is intended to be illustrative, and not restrictive. For example, the above-described embodiments (or one or more aspects thereof) can be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Description of Embodiments, various features can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A non-transitory machine readable medium comprising instructions stored thereon, which when executed by a machine cause the machine to perform operations for crowdsourcing information about a first company of a social network site, the operations comprising:
   determining whether the first company referenced in a profile of a user of users has a profile and in response to determining the first company does not have a profile, automatically producing the profile for the first company to create the auto-created profile;
   identifying the first company has an auto-created profile on the social network site, the auto-created profile created in response to determining an entity identification number does not match any entries in a database of entity identification numbers and the auto-created profile including data gathered automatically from respective profiles of one or more users that include the first company in their profile;
   identifying the users of the social network site associated with the first company based upon determining the users include the first company in their profile or include a second company in their profile where the second company includes an industry identifier that matches an industry identifier of the first company;
   prompting the identified users determined to be associated with the first company to provide new data about the first company;
   determining a most popular response from responses to the prompting from the users; and
   updating the auto-created profile of the first company to include the determined most popular response from the users.

2. The medium of claim 1, wherein the operations further comprise:
  determining which user of the users is likely to respond to the prompting by determining a weighted sum of one or more attributes for each of the users and prompting only users with a weighted sum above a specified threshold.

3. The medium of claim 1, wherein the instructions for determining the users of the social network site associated with the first company include instructions for determining the users include the first company in their profile.

4. The medium of claim 1, wherein the determined users of the social network site are a former or current employee of the second company and the second company includes an industry identifier that is the same as an industry identifier of the first company.

5. The medium of claim 1, wherein the operations further comprise, before prompting a user of the users associated with the first company to provide new data about the first company, verifying the user is or was associated with the first company by asking one or more other users of the social network site that are or were associated with the first company, according to their respective profile on the social network site, at the same time as the user, if they know the user.

6. The medium of claim 1, wherein the operations further comprise prompting the user to verify data about the first company in the auto-created profile.

7. The medium of claim 1, further comprising instructions that, when executed by the machine, configure the machine to prompt another user of the users to verify the new data provided by the user is accurate and wherein the instructions for updating the auto-created profile include instructions to update the data of the profile only if the another user verifies the data is accurate.

8. A method comprising operations performed using one or more hardware processors, the operations comprising:
  determining if a first company referenced in a profile of a user of the users has a profile;
  in response to determining the first company does not have a profile, automatically producing the profile for the first company to create the auto-created profile;
  identifying the first company has an auto-created profile on the social network site, the auto-created profile created in response to determining an entity identification number does not match any entries in a database of entity identification numbers and the auto-created profile including data gathered automatically from respective profiles of one or more users that include the first company in their profile;
  identifying users of the social network site associated with the first company based upon determining the users include the first company in their profile or include a second company in their profile where the second company includes an industry identifier that matches an industry identifier of the first company;
  prompting the identified users determined to be associated with the first company to provide new data about the first company;
  determining a most popular response from responses to the prompting from the users; and
  updating the auto-created profile of the first company to include the determined most popular response from the users.

9. The method of claim 8, further comprising determining which user of the users is likely to respond to the prompting by determining a weighted sum of one or more attributes for each of the users and prompting only users with a weighted sum above a specified threshold.

10. The method of claim 8, wherein determining the users of the social network site associated with the first company includes determining the users include the first company in their profile.

11. The method of claim 8, wherein the identified users of the social network site are a formerly or currently associated with the second company and the second entity includes an industry identifier that is the same as an industry identifier of the first company.

12. A system comprising:
  one or more hardware processors;
  one or more memories communicatively coupled to the one or more hardware processors, the one or more memories including stored thereon, the one or more memories further including instructions stored thereon, which when executed by the one or more processors, cause the one or more processors to perform operations for crowdsourcing company information, the operations comprising:
    determining whether a first company referenced in a profile of a user of users has a profile and in response to determining the first company does not have a profile, automatically producing the profile for the first company to create the auto-created profile;
    identifying the first company has an auto-created profile on the social network site, the auto-created profile created in response to determining an entity identification number does not match any entries in a database of entity identification numbers and the auto-created profile including data gathered automatically from respective profiles of one or more users that include the first company in their profile;
    identifying users of the social network site associated with the first company based upon determining the users include the first company in their profile or include a second company in their profile where the second company includes an industry identifier that matches an industry identifier of the first company;
    prompting the identified users determined to be associated with the first company to provide new data about the first company;
    determining a most popular response from responses to the prompting from the users; and
    updating the auto-created profile of the first company to include the determined most popular response from the users.

13. The system of claim 12, wherein the operations further comprise, before prompting a user of the users associated with the first company to provide new data about the first company, verifying the user is or was associated with the first company by asking one or more other users of the social network site that are or were associated with the first company, according to their respective profile on the social network site, at the same time as the user, if the determined user is or was associated with the first entity.

14. The system of claim 12, wherein the operations further comprise prompting a user of the users associated with the first entity to verify data about the first company in the auto-created profile.

* * * * *